United States Patent
Minamikawa et al.

(10) Patent No.: US 11,934,732 B2
(45) Date of Patent: Mar. 19, 2024

(54) PRINTING DEVICE CAUSING EXTERNAL DEVICE TO ACQUIRE PAYMENT INFORMATION OF FEE REQUIRED FOR EXECUTING PRINT JOB WITH THE PRINTING DEVICE

(71) Applicant: BROTHER KOGYO KABUSHIKI KAISHA, Nagoya (JP)

(72) Inventors: Shunsuke Minamikawa, Nagoya (JP); Tetsuya Okuno, Nagoya (JP); Haruka Azechi, Nagoya (JP); Ayaka Hotta, Kitanagoya (JP); Yushi Deura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/936,455

(22) Filed: Sep. 29, 2022

(65) Prior Publication Data
US 2023/0029123 A1 Jan. 26, 2023

Related U.S. Application Data

(63) Continuation of application No. PCT/JP2021/011394, filed on Mar. 19, 2021.

(30) Foreign Application Priority Data

Mar. 31, 2020 (JP) .................. 2020-063736

(51) Int. Cl.
*G06F 3/12* (2006.01)
*H04N 1/34* (2006.01)

(52) U.S. Cl.
CPC ........... *G06F 3/1288* (2013.01); *H04N 1/344* (2013.01)

(58) Field of Classification Search
None
See application file for complete search history.

(56) References Cited

U.S. PATENT DOCUMENTS

| | | | | |
|---|---|---|---|---|
| 2009/0066985 | A1* | 3/2009 | Ferlitsch | G06Q 10/107 455/406 |
| 2013/0250330 | A1* | 9/2013 | Chigusa | H04N 1/00973 358/1.14 |
| 2018/0213115 | A1 | 7/2018 | Sun et al. | |

FOREIGN PATENT DOCUMENTS

| | | |
|---|---|---|
| JP | 2002116902 A | 4/2002 |
| JP | 2002304274 A | 10/2002 |

(Continued)

OTHER PUBLICATIONS

International Search Report dated Jun. 22, 2021 issued in PCT/JP2021/011394.

(Continued)

*Primary Examiner* — Lennin R Rodriguezgonzalez
(74) *Attorney, Agent, or Firm* — Scully, Scott, Murphy & Presser, PC

(57) ABSTRACT

A printing device includes: a printing unit; and a controller. The printing unit is configured to print an image on a print medium. The controller is configured to perform: (a) receiving; (b) transmitting; (c) receiving; and (d) transmitting. The (a) receiving receives a print job from an external device. The (b) receiving receives a print job from an external device. The (b) transmitting transmits the print job to a data processing server. The (c) receiving receives, from the external device, destination information representing a destination of payment information of a fee required for executing the print job with the printing unit. The (d) transmitting transmits the destination information to the data processing (Continued)

server to cause the data processing server to provide the payment information to the external device.

12 Claims, 9 Drawing Sheets

(56)  References Cited

FOREIGN PATENT DOCUMENTS

| JP | 2004054658 A | 2/2004 |
|----|--------------|--------|
| JP | 2018118406 A | 8/2018 |

OTHER PUBLICATIONS

International Report on Patentability and Written Opinion dated Sep. 29, 2022 issued in PCT/JP2021/011394 together with English language translation.
Japanese Notice of Reasons for Refusal dated Dec. 22, 2023 from related JP 2020-063736 together with an English language translation.

* cited by examiner

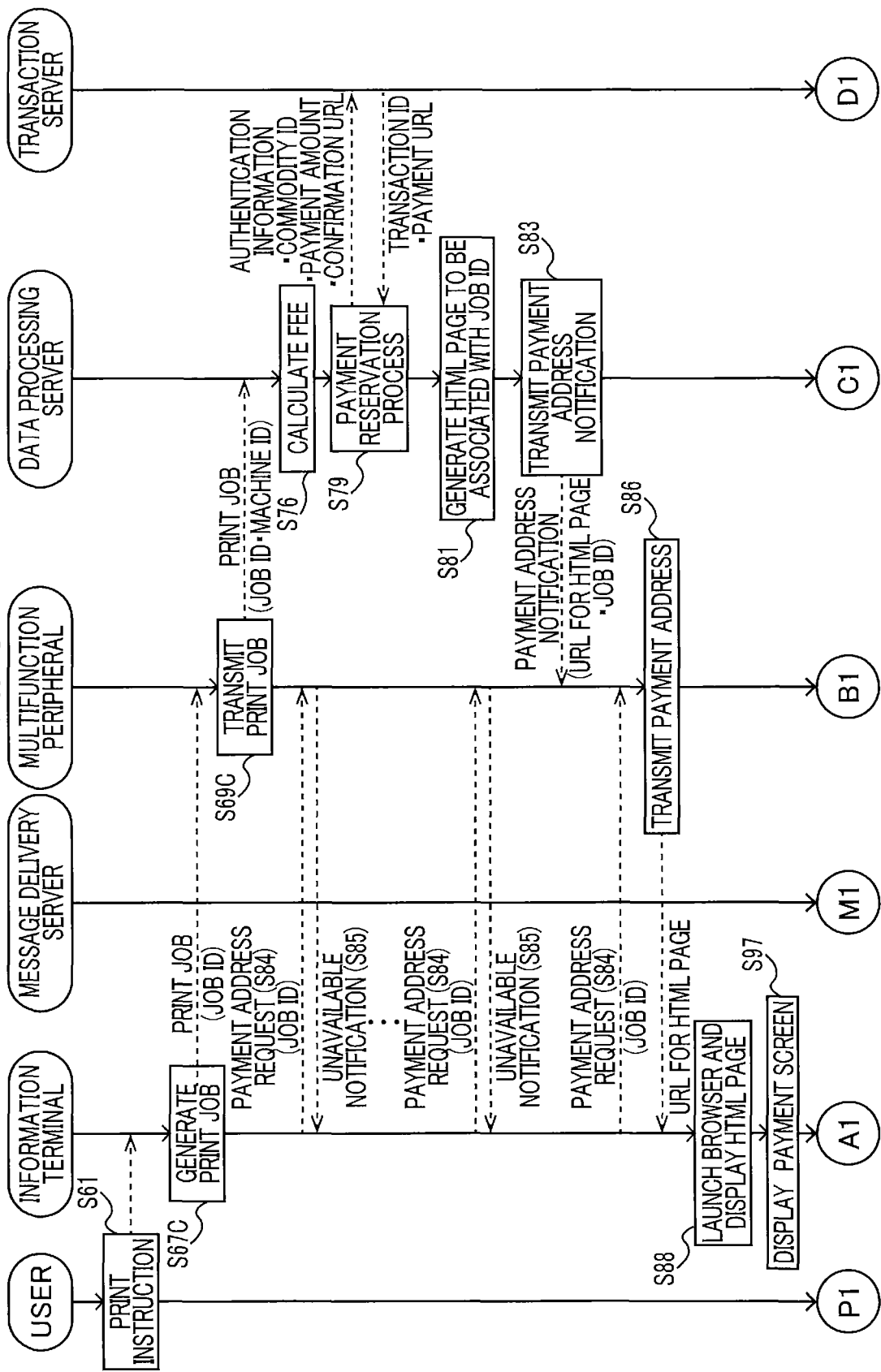

PRINTING DEVICE CAUSING EXTERNAL DEVICE TO ACQUIRE PAYMENT INFORMATION OF FEE REQUIRED FOR EXECUTING PRINT JOB WITH THE PRINTING DEVICE

REFERENCE TO RELATED APPLICATIONS

This application is a by-pass continuation application of International Application No. PCT/JP2021/011394 filed Mar. 19, 2021 claiming priority from Japanese Patent Application No. 2020-063736 filed Mar. 31, 2020. The entire contents of the international application and the priority application are incorporated herein by reference.

BACKGROUND ART

There has been conventionally known a printing system comprising a multifunction peripheral (MFP) and a computer. When an external electronic device transmits print data to the MFP, the MFP transfers the print data to the computer to calculate the fee required for printing. The computer then transmits a two-dimensional code for the calculated fee to the MFP, and the MFP displays this code on a display unit.

DESCRIPTION

However, when the user wishes to pay the calculated fee in order for the MFP to perform printing based on print data in the conventional document printing system, the user must go to the location of the MFP and scan the two-dimensional code displayed on the display unit of the MFP with a user terminal. Thus, the conventional document printing system was not convenient to use.

In view of the foregoing, it is an object of the present disclosure to provide a printing device, a printing system, a computer-readable storage medium storing computer-readable instructions, and a method that can improve user-friendliness by enabling the user to perform operations on an external device for paying the fee required to execute a print job transmitted from the external device.

In order to attain the above and other object, according to one aspect, the present disclosure provides a printing device including: a printing unit; and a controller. The printing unit is configured to print an image on a print medium. The controller is configured to perform: (a) receiving; (b) transmitting; (c) receiving; and (d) transmitting. The (a) receiving receives a print job from an external device. The (b) transmitting transmits the print job to a data processing server. The (c) receiving receives, from the external device, destination information representing a destination of payment information of a fee required for executing the print job with the printing unit. The (d) transmitting transmits the destination information to the data processing server to cause the data processing server to provide the payment information to the external device.

With the printing device according to the above aspect of the present disclosure, providing the payment information to the external device using the destination information enables the user to perform operations for paying the fee on the external device. Moreover, the print job can be executed using a general-purpose printing function provided in the external device according to this method, eliminating the need to use a dedicated printing application program or dedicated printer driver on the external device. Thus, this method can improve user-friendliness.

According to another aspect, the present disclosure also provides a printing device including: a printing unit; and a controller. The printing unit is configured to print an image on a print medium. The controller is configured to perform: (a) receiving; (b) transmitting; (c) receiving; and (d) transmitting. The (a) receiving receives a print job from an external device having an operating system function. The (b) transmitting transmits the print job to a data processing server. The (c) receiving receives, from the data processing server, source information identifying a source of payment information of a fee required for executing the print job with the printing unit. The external device is configured to access the source through the operating system function. The (d) transmitting transmits the source information to the external device to cause the external device to acquire the payment information.

With the printing device according to the above aspect of the present disclosure, providing the payment information to the external device using the source information enables the user to perform operations for paying the fee on the external device. Moreover, the print job can be executed using a general-purpose printing function provided in the external device according to this method, eliminating the need to use a dedicated printing application program or dedicated printer driver on the external device. Thus, this method can improve user-friendliness.

According to still another aspect, the present disclosure also provides a non-transitory computer-readable storage medium storing a set of computer-readable instructions installed on and executed by a controller of a printing device. The printing device includes a printing unit. The printing unit configured to print an image on a print medium. The set of computer-readable instructions, when executed by the controller, causes the printing device to perform: (a) receiving; (b) transmitting; (c) receiving; and (d) transmitting. The (a) receiving receives a print job from an external device. The (b) transmitting transmits the print job to a data processing server. The (c) receiving receives, from the external device, destination information representing a destination of payment information of a fee required for executing the print job with the printing unit. The (d) transmitting transmits the destination information to the data processing server to cause the data processing server to provide the payment information to the external device.

According to still another aspect, the present disclosure also provides a non-transitory computer-readable storage medium storing a set of computer-readable instructions installed on and executed by a controller of a printing device. The printing device includes a printing unit. The printing unit is configured to print an image on a print medium. The set of computer-readable instructions, when executed by the controller, causes the printing device to perform: (a) receiving; (b) transmitting; (c) receiving; and (d) transmitting. The (a) receiving receives a print job from an external device having an operating system function. The (b) transmitting transmits the print job to a data processing server. The (c) receiving receives, from the data processing server, source information identifying a source of payment information of a fee required for executing the print job with the printing unit. The external device is configured to access the source through the operating system function. The (d) transmitting transmits the source information to the external device to cause the external device to acquire the payment information.

According to still another aspect, the present disclosure also provides a method for a printing system. The printing system includes a printing unit. The printing unit is configured to print an image on a print medium. The method includes: (a) receiving; (b) determining; (c) receiving; and (d) providing. The (a) receiving receives a print job from an external device. The (b) determining determines a fee required for executing the print job with the printing unit. The (c) receiving receives, from the external device destination information representing a destination of payment information of a fee required for executing the print job. The (d) providing provides the payment information to the external device using the destination information.

The above configuration enables the user to perform operations on an external device for paying the fee required for executing a print job transmitted from the external device. Thus, the above configuration can improve user-friendliness.

FIG. 9 is a sequence diagram illustrating steps in a principal portion of a process executed by the information terminal, the message delivery server, the multifunction peripheral, the data processing server, and the transaction server.

Figure 1:
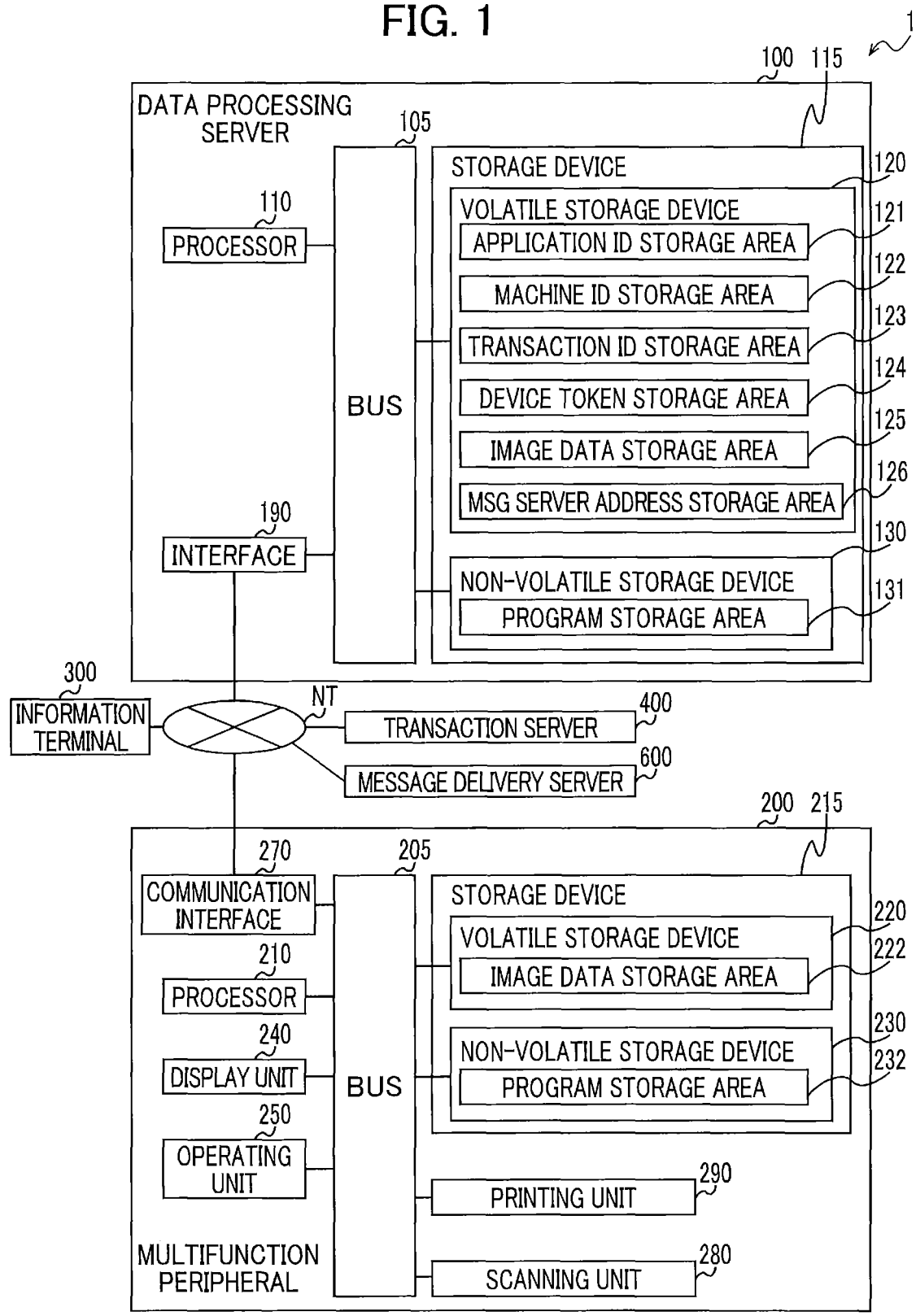
FIG. 1 is a functional block diagram illustrating the schematic overall configuration of a printing system.

FIG. 1 illustrates a printing system 1 according to one embodiment of the present disclosure. In the present embodiment, the printing system 1 provides a printing service in which users, i.e., customers can use the printing function of a multifunction peripheral 200 by paying a fee.

<Outline of Printing System>

The printing system 1 illustrated in FIG. 1 includes a data processing server 100, the multifunction peripheral 200, an information terminal 300, a transaction server 400, and a message delivery server 600. The data processing server 100, the multifunction peripheral 200, the information terminal 300, the transaction server 400, and the message delivery server 600 are interconnected over a network NT to communicate with each other. The information terminal 300 is an example of the external device of the present disclosure.

<Data Processing Server>

The data processing server 100 is installed and managed by the manufacturer of the multifunction peripheral 200, for example. The data processing server 100 includes a processor 110, a storage device 115, and an interface 190. The processor 110, the storage device 115, and the interface 190 are interconnected via a bus 105.

The storage device 115 includes a volatile storage device 120, and a non-volatile storage device 130. The volatile storage device 120 is a DRAM, for example, and has an application ID storage area 121, a machine ID storage area 122, a transaction ID storage area 123, a device token storage area 124, an image data storage area 125, and a message delivery server address storage area (also referred to as "MSG server address storage area") 126. The non-volatile storage device 130 is a hard disk drive or a solid state drive, for example. The non-volatile storage device 130 has a program storage area 131. The contents stored in these storage devices will be described later in detail.

The processor 110 is a device that performs data processing, such as a CPU. By executing a program stored in the program storage area 131, the processor 110 executes various processes, such as those illustrated in FIGS. 2, 3, 5, 7, 9, and the like described later, including processes for performing data communications with the information terminal 300, the multifunction peripheral 200, the transaction server 400, and the message delivery server 600 connected to the network NT.

The interface 190 is a wired LAN interface or a wireless interface for communicating with other devices. The interface 190 is connected to the network NT.

<Transaction Server>

The transaction server 400 is installed at a company providing various online services for settling online payments, for example. Although not illustrated in the drawings, the transaction server 400 includes a processor, a storage device, and an interface for connecting to the network NT.

<Multifunction Peripheral>

The multifunction peripheral 200 is owned by a company providing the printing service described above, for example. The multifunction peripheral 200 includes a scanning unit 280, a printing unit 290, a processor 210, a storage device 215, a display unit 240, a user-operable operating unit 250, and a communication interface 270. The scanning unit 280, the printing unit 290, the processor 210, the storage device 215, the display unit 240, the operating unit 250, and the communication interface 270 are interconnected via a bus 205. The multifunction peripheral 200 is an example of the printing device of the present disclosure.

The storage device 215 has a volatile storage device 220, and a non-volatile storage device 230. The volatile storage device 220 is a DRAM, for example. The volatile storage device 220 includes an image data storage area 222 for storing therein image data. The non-volatile storage device 230 is a flash memory, for example. The non-volatile storage device 230 has a program storage area 232 for storing therein various programs. Of programs stored in the program storage area 232, printing programs according to the present embodiment for executing the processes in FIGS. 2, 3, 5, 7, 9 and the like are pre-stored as firmware, for example.

The processor 210 is a device such as a CPU that performs data processing. By executing the printing programs stored in the program storage area 232, the processor 210 executes a printing method in cooperation with the processor 110 of the data processing server 100 for controlling the printing unit 290 to print images based on image data transmitted from the information terminal 300. The processor 210 is an example of the controller of the present disclosure.

The display unit 240 is a liquid crystal display, for example. The operating unit 250 is a device that receives user operations. By operating the operating unit 250, the user can input various instructions into the multifunction peripheral 200. The communication interface 270 is a wired or wireless network interface for communicating with other devices. The communication interface 270 is connected to the network NT.

The scanning unit 280 is configured to optically read a document or other scanning target using photoelectric conversion elements such as a CCD or a CMOS, and to generate image data representing an image of the scanning target.

The printing unit 290 is configured to print images according to a prescribed method on paper picked up from a feed tray and conveyed using a conveying mechanism (not illustrated). The following description is made for a case in which the printing unit 290 performs printing according to an inkjet method. The printing unit 290 is an example of the printing unit of the present disclosure. The paper is an example of the print medium of the present disclosure.

<Information Terminal>

The information terminal 300 in the present embodiment is an information terminal such as a personal computer, a tablet computer, or a smartphone possessed by the user. The information terminal 300 is connected to the network NT through wireless communication. Although not illustrated in the drawings, the information terminal 300 includes a processor, a storage device, and an interface for connecting to the network NT. In this example, the processor of the information terminal 300 utilizes an operating system (OS) provided with a general-purpose printing function such as Mopria or AirPrint. A preinstalled application program for utilizing the printing service described above is provided in the information terminal 300. The application program is executed and developed on this OS. Note that other types of information terminals may be used as the information terminal 300. "Mopria" is a Japanese registered trademark of Mopria Alliance Incorporated. "AirPrint" is a Japanese registered trademark of Apple Inc.

<Message Delivery Server>

The message delivery server 600 is installed at the management company of a communication service, for example, and is connected to the network NT via wireless or wired communication. Although not illustrated in the drawings, the message delivery server 600 includes a processor, a storage device, and an interface for connecting to the network NT. The message delivery server 600 is an example of the notification server of the present disclosure.

<Features of the Embodiment>

A feature of the present embodiment is a process performed on the printing system 1 having the above configuration that enables printing charges for print jobs transmitted from the information terminal 300 to be settled on the information terminal 300. This feature will be described at length below.

<Process Flow>

Control procedures executed by the processor 210 of the multifunction peripheral 200, the processor 110 of the data processing server 100, the processor of the transaction server 400, the processor of the information terminal 300, and the processor of the message delivery server 600 will be described with reference to FIGS. 2 and 3. Note that, in the following description as to the control procedures (illustrated in FIGS. 2, 3, 5, 7, 9, and the like), references relating to the "processors" will be omitted. As an example, the phrases such as "the processor 210 of the multifunction peripheral 200" of "by the processor 210 of the multifunction peripheral 200" will be simply referred to as "the multifunction peripheral 200" or "by the multifunction peripheral 200", respectively.

Figure 2:
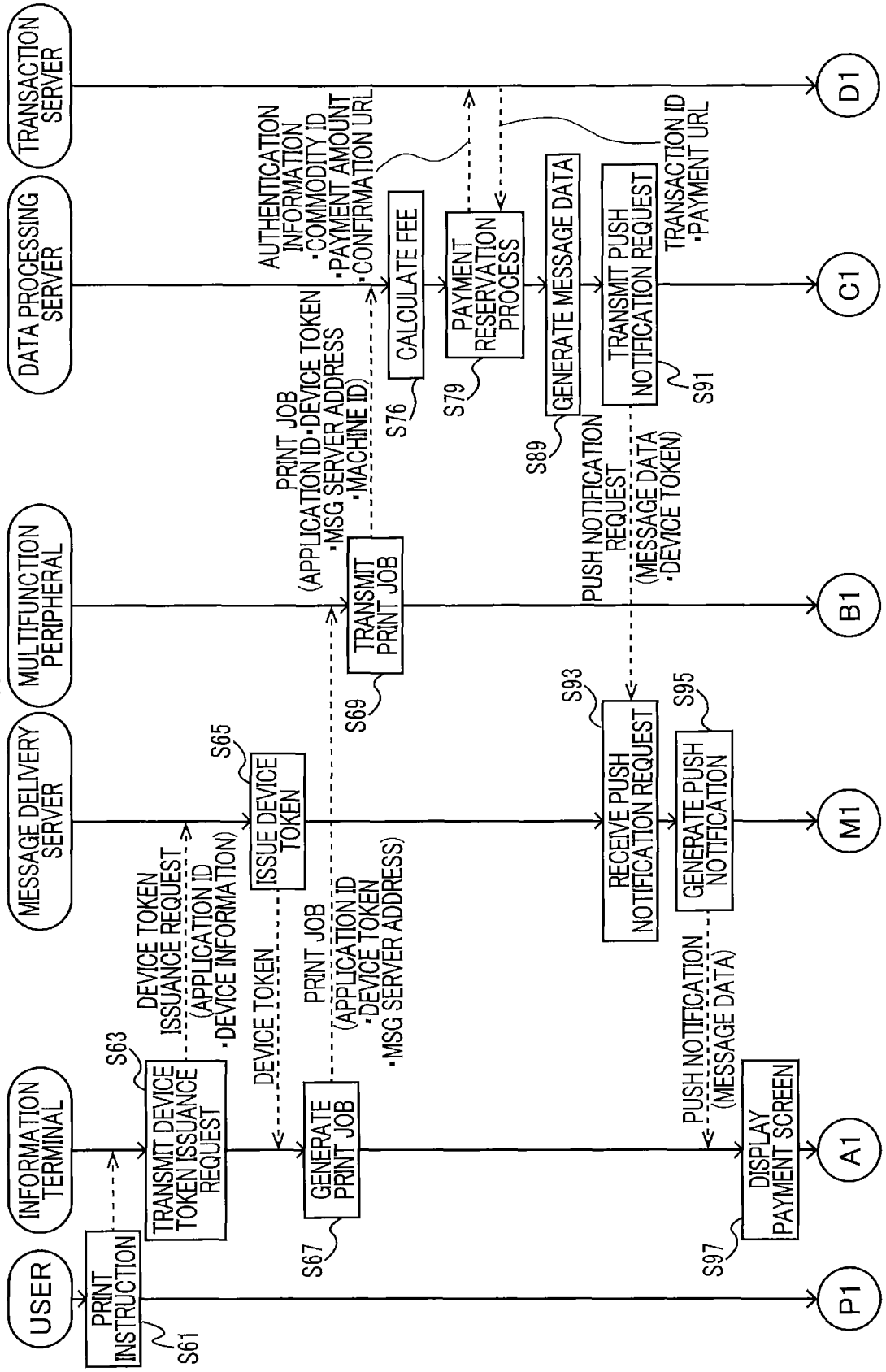
FIG. 2 is a sequence diagram illustrating steps in the first portion of a process executed by an information terminal, a message delivery server, a multifunction peripheral, a data processing server, and a transaction server.
Figure 3:
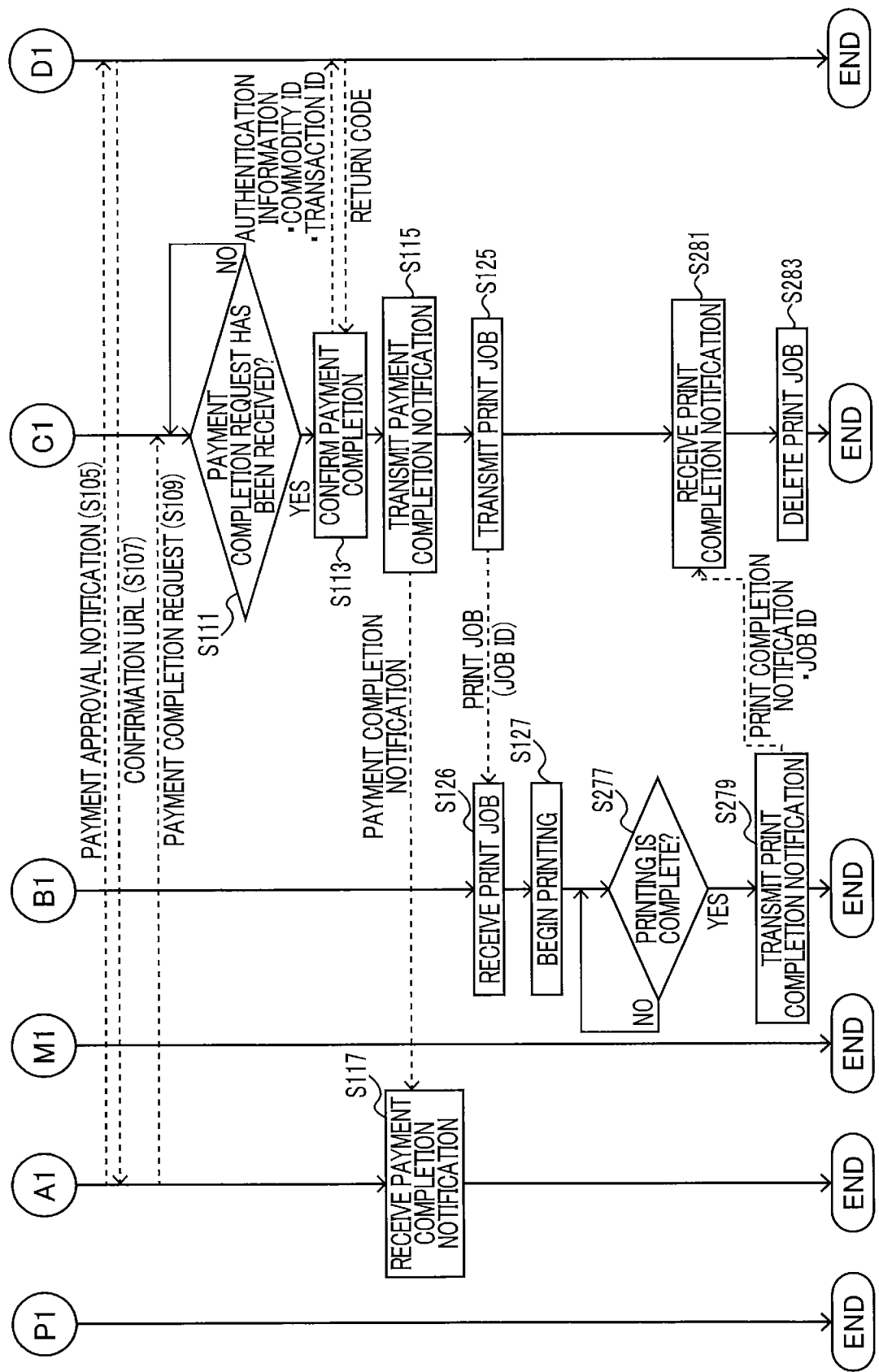
FIG. 3 is a sequence diagram illustrating steps in the second portion of the process executed by the information terminal, the message delivery server, the multifunction peripheral, the data processing server, and the transaction server.

In S61 of FIG. 2, the user first issues a print instruction to print image data prepared by the user through suitable user operations on an operating unit of the information terminal 300. When the information terminal 300 receives this print instruction, in S63 the general-purpose printing function provided in the OS of the information terminal 300 transmits a request to the message delivery server 600 to issue a device token, and the message delivery server 600 receives this request. The request (device token issuance request) issued by the general-purpose printing function includes device information identifying the information terminal 300 itself, and an application ID for identifying the application program described above. The message delivery server 600 receives the device token issuance request.

In response to the device token issuance request received from the information terminal 300, in S65 the message delivery server 600 issues a device token for the information terminal 300, and the information terminal 300 receives this device token. The device token is an example of the token information of the present disclosure and includes the device information identifying the information terminal 300 and the application ID. As will be described later, when the message delivery server 600 subsequently receives this device token, the message delivery server 600 can identify the corresponding information terminal 300 and the application program used on this information terminal 300.

In S67 the general-purpose printing function in the OS of the information terminal 300 generates a print job that includes the above image data and transmits this print job to the multifunction peripheral 200. At this time, the application ID, the device token received from the message delivery server 600, and address information of the message delivery server 600 are included with the transmitted print job.

By receiving the print job transmitted from the information terminal 300 in S67 as described above, the multifunction peripheral 200 acquires the application ID, the device token, and the address information of the message delivery server 600 that are included with the print job.

In S69 the multifunction peripheral 200 transmits the print job to the data processing server 100. At this time, the print job includes therewith the application ID, the device token, the address information of the message delivery server 600, and a machine ID for identifying the multifunction peripheral 200. The machine ID is an example of the second identification information and the third identification information of the present disclosure.

Note that the process of S67 is an example of the (a) receiving of the present disclosure, and the process of S69 is an example of the (b) transmitting of the present disclosure.

In the meantime, the device token and the address information of the message delivery server 600 that the multifunction peripheral 200 receives and transmits to the data processing server 100 are examples of the destination information of the present disclosure, and the message delivery server 600 is an example of the destination of the present disclosure.

Thus, the process of S67 is also an example of the (c) receiving of the present disclosure. In addition, the process of S69 is an example of the (d) transmitting of the present disclosure, since this process causes the message data from the data processing server 100 to be ultimately provided to the information terminal 300.

Upon receiving the print job transmitted from the multifunction peripheral 200 in S69, the data processing server 100 stores the image data, application ID, device token, address information, and machine ID in the corresponding image data storage area 125, application ID storage area 121, device token storage area 124, message delivery server address storage area 126, and machine ID storage area 122. Subsequently, in S76 the data processing server 100 calculates the fee to be charged to the user for printing based on image data using the image data included in this print job. Note that this process of S76 is an example of the (b) determining of the present disclosure. To calculate this fee, the data processing server 100 uses a prescribed fee table stored in an appropriate storage area of the volatile storage device 120, for example. When performing the calculation, the data processing server 100 may also take into account print settings that have been included in the print job when the print job is transmitted from the information terminal 300.

In S79 the data processing server 100 performs a payment reservation process. Specifically, the data processing server 100 transmits a commodity ID issued for executing the printing service for the above print job, the payment amount for the user resulting from the calculation in S76, authentication information used for authentication on the transaction server 400, and a confirmation URL for confirming that payment is complete (a URL for the data processing server 100 in the present embodiment) to the transaction server 400. As a result of this transmission, the data processing server 100 receives a payment URL that the user can access to pay the fee, and a transaction ID related to the fee payment procedure from the transaction server 400. This payment URL is an example of the payment information of the present disclosure.

In S89 the data processing server 100 generates message data to be transmitted to the message delivery server 600 in S91 described below. This message data is created in a format compatible with the application program on the information terminal 300 identified by the application ID included in the print job. The payment URL acquired in S79 is included in this message data. In S91 the data processing server 100 transmits a push notification request, containing the message generated in S89 to the message delivery server 600. In addition to the above message data, the notification request includes the device token received in S69.

The message delivery server 600 receives the push notification request in S93. In response, in S95 the message delivery server 600 generates a push notification that includes the message data received from the data processing server 100 and transmits this push notification to the application program in the information terminal 300 identified by the device token. In the present embodiment, the process of S95 is an example of the (d) providing of the present disclosure.

After receiving this push notification, in S97 the information terminal 300 starts up the aforementioned application program installed on the information terminal 300 and displays a prescribed payment screen including the above payment URL in the application program. At this time, the payment screen has a fee display area that includes the fee calculated above and the like, enabling the user to learn the fee that the user must pay to use the current printing service.

After viewing the fee, the user accesses the payment URL displayed in the payment screen and performs appropriate operations in the screen displayed on the information terminal 300. As a result, in S105 of FIG. 3 the information terminal 300 transmits a payment approval notification to the transaction server 400. The payment approval notification indicates that the user has approved of the above payment process, i.e., has agreed to pay the aforementioned fee.

After subsequently receiving this notification of approval, in S107 the transaction server 400 transmits a confirmation URL for payment to the information terminal 300. Based on this confirmation URL, in S109 the information terminal 300 transmits a payment completion request to the data processing server 100. Consequently, in S111 the data processing server 100 determines that a payment completion request has been received (S111: YES) and in S113 performs a process to confirm payment completion. Specifically, the data processing server 100 transmits the authentication information, the commodity ID, and the transaction ID to the transaction server 400 and receives a return code from the transaction server 400 in response.

After performing the process in S113 to confirm the completion of payment, in S115 the data processing server 100 transmits a payment completion notification for the above print job to the information terminal 300, and the information terminal 300 receives this information in S117. Further, in S125 the data processing server 100 transmits the print job received in S69 to the multifunction peripheral 200 together with the job ID for identifying that print job, and the multifunction peripheral 200 receives this print job in S126. Thereafter, in S127 the multifunction peripheral 200 controls the printing unit 290 to execute the print job received in S126, thereby beginning printing images on sheets of paper.

Note that the present disclosure is not limited to the data processing server 100 transmitting a print job to the multifunction peripheral 200 in S125 and S126 described above and the multifunction peripheral 200 receiving and executing this print job the print job in S127. That is, the multifunction peripheral 200 may save the print job received in S67 described above and may perform printing based on the saved print job in S127.

The multifunction peripheral 200 continues printing based on the print job while printing is not complete (S277: NO). Once the printing based on the print job is complete (S277: YES), in S279 the multifunction peripheral 200 transmits a print completion notification to the data processing server 100 together with the job ID. In S281 the data processing server 100 receives the print completion notification and job ID from the multifunction peripheral 200 and in S283 deletes the print job corresponding to the received job ID from the image data storage area 125, thereby ending the process.

<Effects of the Embodiment>

As described above, when the information terminal 300 in the printing system 1 of the present embodiment transmits a print job to the multifunction peripheral 200, the multifunction peripheral 200 receives the print job and controls the printing unit 290 to print images on sheets of paper based on this print job. The multifunction peripheral 200 also transmits the print job received from the information terminal 300 to the data processing server 100 in order to enable the data processing server 100 to calculate the fee required for executing the print job.

In the meantime, destination information that the information terminal 300 can transmit according to a function of its OS is used in the present embodiment so that the information terminal 300 that has transmitted a print job as described above can also perform a payment procedure to pay the fee charged for printing. That is, the destination information transmitted by the OS of the information terminal 300 is received and acquired by the multifunction peripheral 200, which subsequently transfers this destination information to the data processing server 100 (S69). The data processing server 100 then uses this destination information to transmit a payment URL to the destination corresponding to the destination information, so that the payment URL is ultimately provided to the information terminal 300 (S95). As a result, the user can access the payment URL for paying the fee through an operation on the information terminal 300 in order to proceed to the payment procedure (S97, S105, S107, S109). As described above, providing a payment URL to the information terminal 300 using the destination information enables the user to perform operations for paying the fee on the information terminal 300 in this embodiment. Moreover, the print job can be executed using the general-purpose printing function in the OS of the information terminal 300 according to this method, eliminating the need to use a dedicated printing application program or dedicated printer driver on the information terminal 300. Thus, this method can improve user-friendliness.

One feature of the present embodiment is that the destination information transmitted by the OS of the information terminal 300 includes the address information of the message delivery server 600 and a device token. When receiving this information, the data processing server 100 transmits a push notification request including this device token to the message delivery server 600 based on the received address information (S91). On the basis of this information, the message delivery server 600 identifies both the information terminal 300 and the application program on the information terminal 300.

By transmitting a push notification to the identified information terminal 300, the message delivery server 600 can launch the identified application program and display the payment URL received from the message delivery server 600 in a fee display area of the payment screen on the application program (S97). As a result, operations for paying the fee described above can be reliably performed on the information terminal 300 using the payment URL.

Another feature of this embodiment is that a machine ID for identifying the multifunction peripheral 200 is associated with one of the print job, the device token, and the address information of the message delivery service. Hence, on the basis of the machine ID, the data processing server 100 can identify the multifunction peripheral 200 that will be executing the print job when calculating the fee for the print job.

<Variations and Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. Note that, in the modifications described below, parts and components the same as the embodiment described above are designated with the same reference numerals appropriately to avoid the duplicating description.

<(1) Transmitting Message Data to the e-Mail Address of the Information Terminal>

Figure 4:
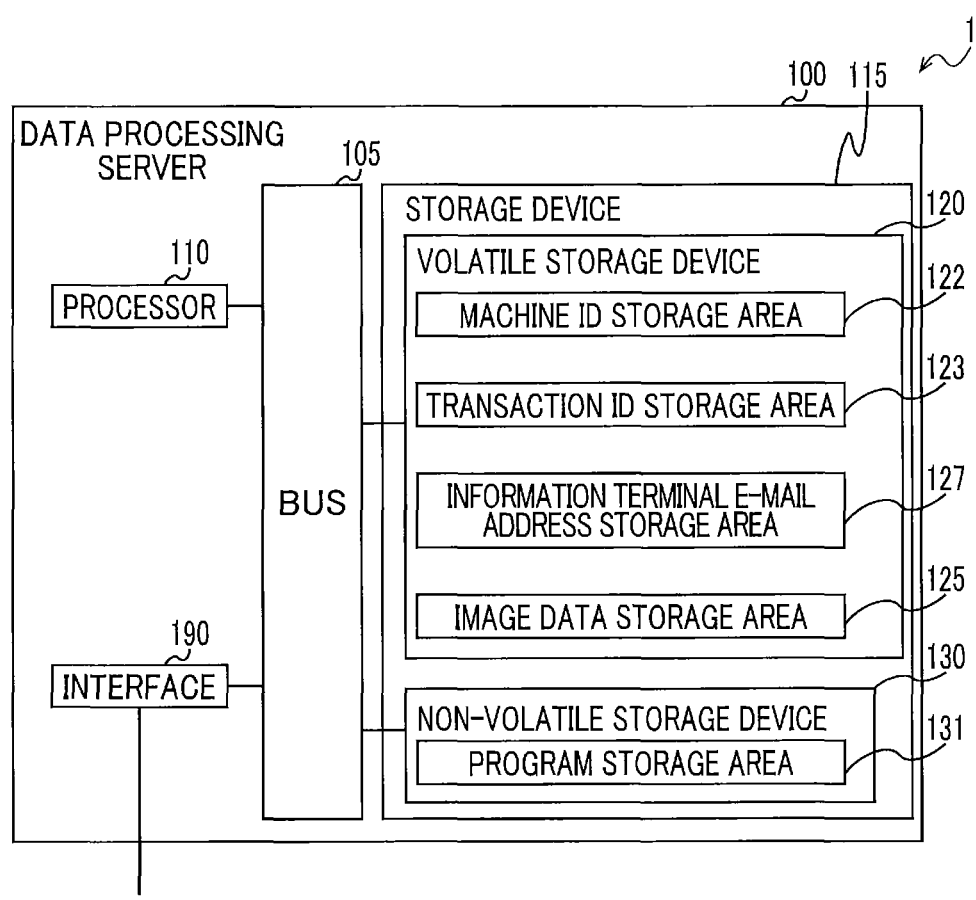
FIG. 4 is a functional block diagram illustrating the schematic configuration of a main portion of a printing system.

FIG. 4, which corresponds to FIG. 1 in the embodiment described above, illustrates the main portion of the printing system in this modification. In the printing system of this modification, the configuration of the storage device 115 in the data processing server 100 differs from that in the embodiment, as illustrated in FIG. 4. That is, an information terminal e-mail address storage area 127 is provided in the volatile storage device 120 in place of the application ID storage area 121, the device token storage area 124, and the message delivery server address storage area 126. The remaining configuration is identical to that in FIG. 1.

The principal portion of the control procedures in this modification will be described with reference to FIG. 5, which corresponds to FIG. 2 in the embodiment. These control procedures represent processes executed by the processor 210 of the multifunction peripheral 200, the processor 110 of the data processing server 100, the processor of the transaction server 400, and the processor of the information terminal 300.

Figure 5:
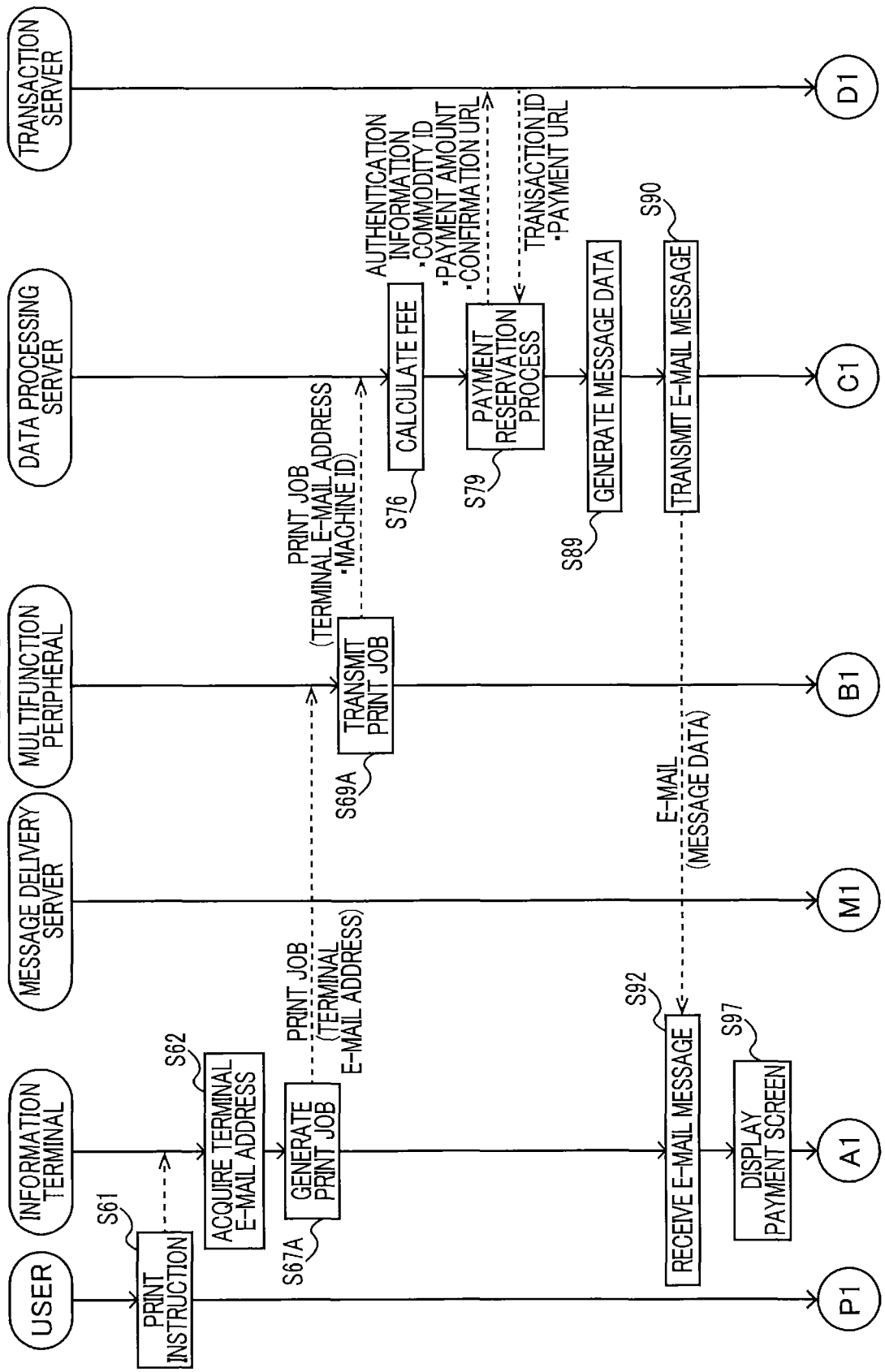
FIG. 5 is a sequence diagram illustrating steps in a principal portion of a process executed by the information terminal, the message delivery server, the multifunction peripheral, the data processing server, and the transaction server.

In S61 of FIG. 5, the user performs an appropriate operation to issue a print instruction for printing image data, as in FIG. 2 of the embodiment. In S62 the general-purpose printing function provided in the OS of the information terminal 300 acquires the e-mail address for the information terminal 300 (also referred to as "terminal e-mail address"). In this modification, the e-mail address for the information terminal 300 is an example of the address information of the external device of the present disclosure. In S67A, which corresponds to S67 in FIG. 2, the general-purpose printing function on the information terminal 300 generates a print job that includes the image data and transmits this print job to the multifunction peripheral 200. When transmitting this print job, the general-purpose printing function also includes the e-mail address for the information terminal 300 acquired in S62 with the print job.

Thus, by receiving the print job from the information terminal 300, the multifunction peripheral 200 also acquires the e-mail address of the information terminal 300 included with the print job. In S69A, which corresponds to S69 in FIG. 2, the multifunction peripheral 200 transmits to the data processing server 100 the print job with which the e-mail address of the information terminal 300 and the machine ID of the multifunction peripheral 200 are included. In this modification, the machine ID is an example the second identification information of the present disclosure.

Moreover, in this modification, the process of S67A is an example of the (a) receiving of the present disclosure. In addition, the process of S69A is an example of the (b) transmitting of the present disclosure.

In the meantime, the e-mail address of the information terminal 300 that the multifunction peripheral 200 receives in S67A and transmits to the data processing server in S69A described above is an example of the destination information of the present disclosure, and the information terminal 300 is an example of the destination of the present disclosure.

Thus, the process of S67A is an example of the (c) receiving of the present disclosure. In addition, the process of S69A is an example of the (d) transmitting of the present disclosure, since this process causes the message data from the data processing server 100 to be ultimately provided to the information terminal 300.

When receiving a print job transmitted from the multifunction peripheral 200 in S69A, the data processing server 100 stores the image data, e-mail address for the information terminal 300, and machine ID in the corresponding image data storage area 125, information terminal e-mail address storage area 127, and machine ID storage area 122.

Next, as in FIG. 2 described above, in S76 the data processing server 100 calculates a fee for the print job, in S79 performs the payment reservation process to acquire a payment URL, and in S89 generates message data that contains the payment URL, the fee calculated in S76, and the like.

In S90 the data processing server 100 generates an e-mail message that includes the message data generated in S89 and transmits this e-mail message to the e-mail address for the information terminal 300 acquired in S69A. In this modification, the process of S90 is an example of the (d) providing of the present disclosure.

In S92 the information terminal 300 receives the e-mail message transmitted from the data processing server 100. When the user opens this e-mail message, in S97 the information terminal 300 displays the payment URL, the calculated fee, and the like. Through appropriate operations on the information terminal 300, the user can access the displayed payment URL to proceed to the payment procedure. The remaining steps in this process are identical to those in the embodiment and will not be described here.

This modification obtains the same effects described above in the embodiment. That is, the multifunction peripheral 200 receives the destination information transmitted by the OS of the information terminal 300 and subsequently transfers the destination information to the data processing server 100 (S69A). Using this destination information, the data processing server 100 transfers a payment URL to the destination corresponding to the destination information, thereby providing the information terminal 300 with a payment URL (S92). Accordingly, the user can access the payment URL for paying the fee through an operation on the information terminal 300 in order to proceed to the payment procedure (S97, S105, S107, S109).

Another feature of the present modification is that the destination information transmitted by the OS of the information terminal 300 includes the e-mail address of the information terminal 300. That is, the data processing server 100 that receives this e-mail address can access the target information terminal 300 based on the e-mail address (S90) and provide a payment URL to the information terminal 300 (S92). As a result, operations for paying the fee described above can be reliably performed on the information terminal 300 using the payment URL.

<(2) Push Notifications without the Use of a Message Delivery Server and Tokens>

Figure 6:
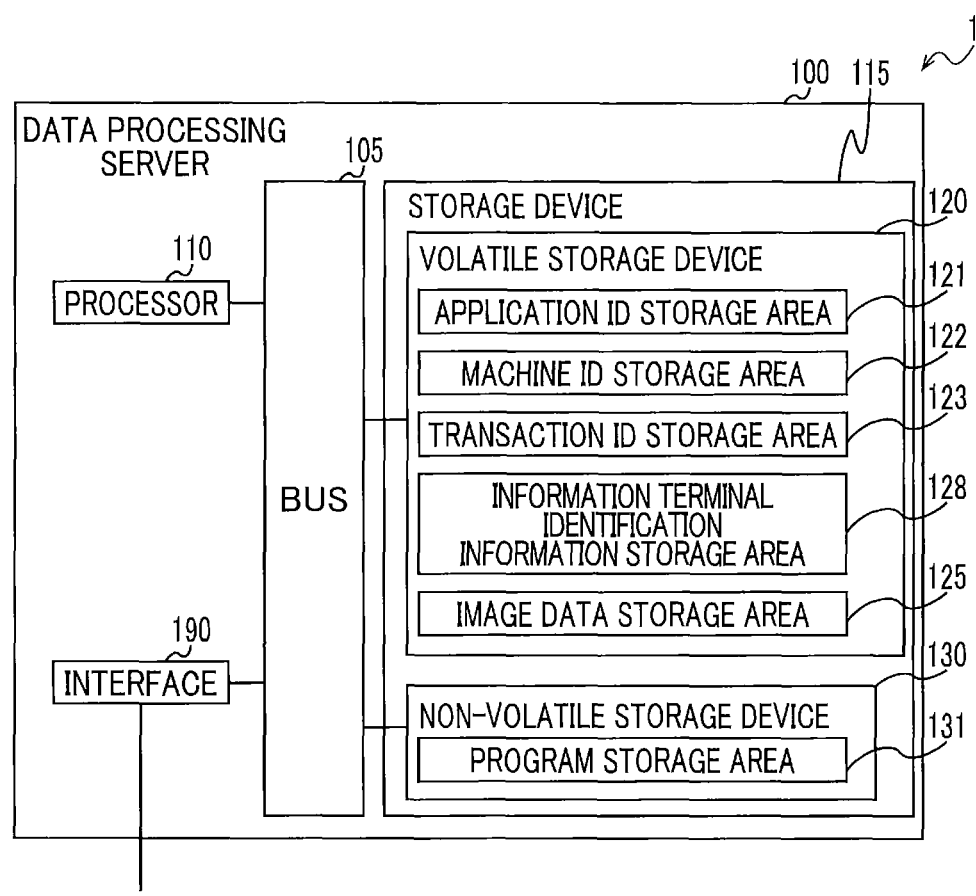
FIG. 6 is a functional block diagram illustrating the schematic configuration of a main portion of a printing system.

FIG. 6, which corresponds to FIG. 1 in the embodiment described above, illustrates the principal parts of a printing system in the present modification. As illustrated in FIG. 6, in the printing system of this modification, the structure of the storage device 115 in the data processing server 100 differs from that in the embodiment. Specifically, an information terminal identification information storage area 128 is provided in the volatile storage device 120 in place of the device token storage area 124 and message delivery server address storage area 126 of the embodiment. The remaining structure is identical to that illustrated in FIG. 1.

Principal portions of control procedures in this modification will be described with reference to FIG. 7, which corresponds to FIG. 2 in the embodiment. The control procedures represent processes executed by the processor 210 of the multifunction peripheral 200, the processor 110 of the data processing server 100, the processor of the transaction server 400, and the processor of the information terminal 300.

Figure 7:
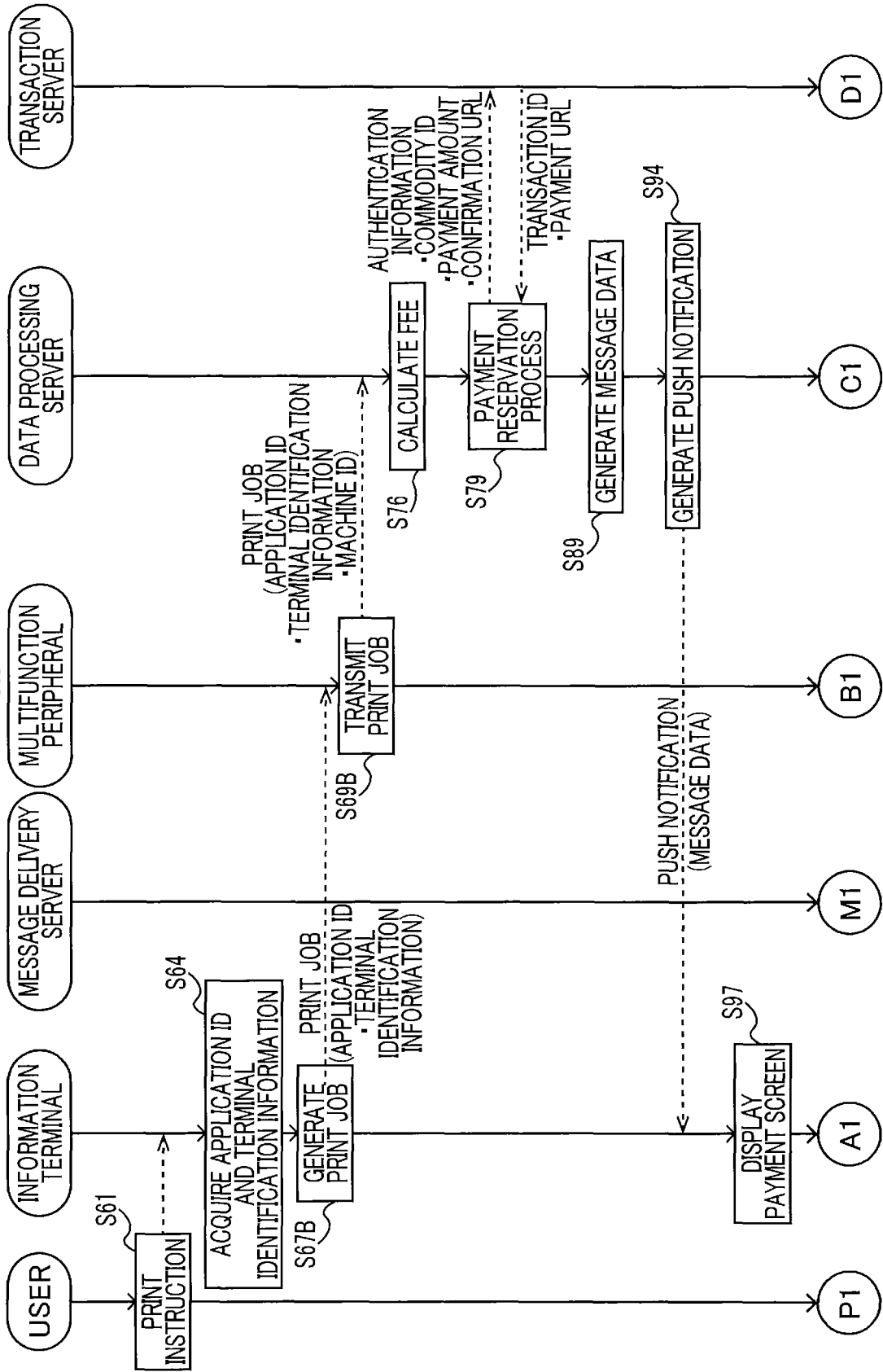
FIG. 7 is a sequence diagram illustrating steps in a principal portion of a process executed by the information terminal, the message delivery server, the multifunction peripheral, the data processing server, and the transaction server.

In S61 of FIG. 7, as in FIG. 2 described above, the user performs an appropriate operation on the information terminal 300 to issue a print instruction to print image data. In S64 the general-purpose printing function in the OS of the information terminal 300 acquires the application ID for identifying the application program in the information terminal 300, and terminal identification information for identifying the information terminal 300. In this modification, the application ID is an example of the application program identification information of the present disclosure, and the terminal identification information is an example of the first identification information of the present disclosure.

In S67B, which corresponds to S67 in FIG. 2, the general-purpose printing function in the OS of the information terminal 300 generates a print job that includes the above image data and transmits this print job to the multifunction peripheral 200. At this time, the application ID and terminal identification information acquired in S64 are included with the print job.

By receiving this print job transmitted from the information terminal 300, the multifunction peripheral 200 acquires the application ID and terminal identification information included with the print job. In S69B, which corresponds to S69 in FIG. 2, the multifunction peripheral 200 transmits to the data processing server 100 the print job with which the application ID, terminal identification information, and machine ID of the multifunction peripheral 200 are included. In this modification, the machine ID is an example of the second identification information of the present disclosure.

In the present modification, the process of S67B is an example of the (a) receiving of the present disclosure. In addition, the process of S69B is an example of the (b) transmitting of the present disclosure.

In the meantime, the application ID and the terminal identification information that the multifunction peripheral 200 receives in S67B and transmits to the data processing server 100 in S69B are examples of the destination information of the present disclosure. The information terminal 300 is an example of the destination of the present disclosure.

Thus, the process of S67B is an example of the (c) receiving of the present disclosure. In addition, the process of S69B is an example of the (d) transmitting of the present disclosure, since this process causes the message data from the data processing server 100 to be ultimately provided to the information terminal 300.

When receiving a print job transmitted from the multifunction peripheral 200 in S69B, the data processing server 100 stores the image data, application ID, terminal identification information, and machine ID in the corresponding image data storage area 125, application ID storage area 121, information terminal identification information storage area 128, and machine ID storage area 122.

As in FIG. 2 of the embodiment, in S76 of this modification the data processing server 100 calculates the fee for printing, in S79 performs the payment reservation process to acquire a payment URL, and in S89 generates message data including this payment URL.

Subsequently, in S94 the data processing server 100 generates a push notification including the message data generated in S89 and uses the terminal identification information and application ID acquired in S69B to identify the corresponding application program in the information terminal 300 and transmit the push notification to the information terminal 300. In this modification, the process of S94 is an example of the (d) providing of the present disclosure.

Upon receiving this push notification, in S97 the information terminal 300 starts up the application program identified by the application ID to display a prescribed payment screen that includes the payment URL and fee, as in the embodiment described above. Thereafter, the user can access the payment URL to proceed to the payment process. Subsequent steps in this process are identical to those in the embodiment and will not be described here.

This modification also obtains the same effects described above in the embodiment. That is, the multifunction peripheral 200 receives the destination information transmitted by the OS of the information terminal 300 and subsequently transfers the destination information to the data processing server 100 (S69B). Using this destination information, the data processing server 100 transfers a payment URL to the destination corresponding to the destination information, thereby providing the information terminal 300 with the payment URL (S92). Accordingly, the user can access the payment URL for paying the fee through an operation on the information terminal 300 in order to proceed to the payment procedure (S97, S105, S107, S109).

One feature of the present modification is that the destination information transmitted through the general-purpose printing function in the OS of the information terminal 300 includes terminal identification information for the information terminal 300, and an application ID. The data processing server 100 that receives this terminal identification information and application ID can identify the target information terminal 300 based on the terminal identification information. Further, by transmitting a push notification to the application program in the identified information terminal 300, the data processing server 100 can start up the application program identified by the application ID and display a payment URL in the application program. As a result, operations for paying the fee described above can be reliably executed on the information terminal 300 based on the payment URL.

<(3) Transmitting the URL for a Server-Generated HTML Page to the Information Terminal>

Figure 8:
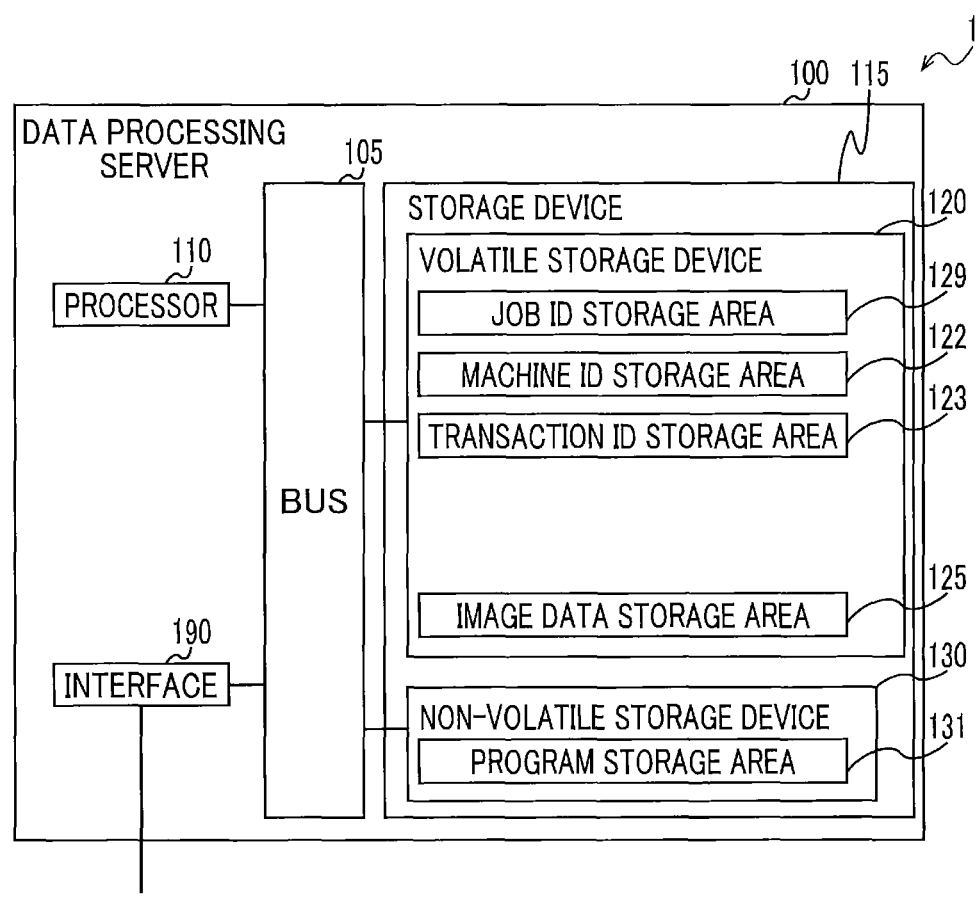
FIG. 8 is a functional block diagram illustrating the schematic configuration of a main portion of a printing system.

FIG. 8, which corresponds to FIG. 1 in the embodiment described above, illustrates the main portion of the printing system in this modification. In the printing system of this modification, the configuration of the storage device 115 in the data processing server 100 differs from that in the embodiment, as illustrated in FIG. 8. That is, a job ID storage area 129 is provided in the volatile storage device 120 in place of the application ID storage area 121, the device token storage area 124, and the message delivery server address storage area 126. The remaining configuration is identical to that in FIG. 1.

The principal portion of the control procedures in this modification will be described with reference to FIG. 9, which corresponds to FIG. 2 in the embodiment. These control procedures represent processes executed by the processor 210 of the multifunction peripheral 200, the processor 110 of the data processing server 100, the processor of the transaction server 400, and the processor of the information terminal 300.

In S61 of FIG. 9, the user performs an appropriate operation to issue an instruction for printing based on image data, as in FIG. 2 of the embodiment. In S67C, which corresponds to S67 in FIG. 2, the general-purpose printing function in the OS of the information terminal 300 generates a print job that includes the image data and transmits this print job to the multifunction peripheral 200. At this time, the general-purpose printing function includes a job ID with the print job being transmitted. The job ID has been suitably associated with the print job and functions to identify the same. In the present modification, this job ID is an example of the second identification information of the present disclosure.

Thus, by receiving the print job from the information terminal 300, the multifunction peripheral 200 also acquires the job ID included with the print job. In S69C, which corresponds to S69 in FIG. 2, the multifunction peripheral 200 transmits the print job to the data processing server 100 with which the job ID and a machine ID for the multifunction peripheral 200 are included. Here, the machine ID can be associated with either this print job or with the URL of an HTML, page described later. In the present modification, this machine ID is an example of the third identification information of the present disclosure.

In this modification, the process of S67C is an example of the (a) receiving of the present disclosure. In addition, the process of S69C is an example of the (b) transmitting of the present disclosure.

When receiving the print job transmitted from the multifunction peripheral 200 in S69C, the data processing server 100 stores the image data, job ID, and machine ID in the corresponding image data storage area 125, job ID storage area 129, and machine ID storage area 122.

Next, as in FIG. 2 described above, in S76 the data processing server 100 calculates a fee for the print job, and in S79 performs the payment reservation process to acquire a payment URL.

After completing the process in S79, in S81 the data processing server 100 generates an HTML page to be associated with the job ID acquired in S69C. This HTML page is configured as a web page provided with a URL that the information terminal 300 can access with its OS function. The HTML page also includes at least the payment URL acquired in S79.

In S83 the data processing server 100 transmits a payment address notification to the multifunction peripheral 200. The payment address notification includes the URL for the HTML page generated in S81 as the address for paying the fee calculated in S76. In addition to the URL of the above HTML page, the payment address notification includes the job ID received in S69C.

By receiving this payment address notification transmitted from the data processing server 100 in S83, the multifunction peripheral 200 acquires the job ID and URL for the HTML page included in the payment address notification.

In the meantime, after the information terminal 300 transmits the job ID together with the print job to the multifunction peripheral 200 in S67C, in S84 the information terminal 300 periodically transmits a payment address request to the multifunction peripheral 200 requesting that the multifunction peripheral 200 return a URL for the HTML page. This payment address request either includes the job ID or is suitably associated with the job ID. The payment address request is an example of the transmission request of the present disclosure.

When the multifunction peripheral 200 receives the payment address request from the information terminal 300 in S84 before acquiring the URL for an HTML page in S83 described above, in S85 the multifunction peripheral 200 transmits an unavailable notification to the information terminal 300 indicating that the URL for an HTML page has not yet been acquired. When the multifunction peripheral 200 receives the payment address request from the information terminal 300 in S84 after acquiring the URL for an HTML page in S83, in S86 the multifunction peripheral 200 transmits the acquired URL for an HTML page corresponding to the job ID associated with the payment address request to the information terminal 300.

When receiving the URL for an HTML page, the information terminal 300 launches a browser using the general-purpose printing function in the OS and accesses the URL to display the HTML page, which includes the payment URL, fee, and the like (S88, S97). The user can proceed to the payment process by accessing the payment URL displayed in the HTML page through operations on the information terminal 300. The remaining steps in this process are identical to those in the embodiment and will not be described here.

The URL for an HTML page that the multifunction peripheral 200 receives in S83 and transmits to the information terminal 300 in S86 is an example of the source information of the present disclosure, and also an example of the web access information of the present disclosure. The HTML page is an example of the source of the present disclosure.

Thus, the process of S83 is an example of the (c) receiving of the present disclosure. In addition, the process of S86 is an example of the (d) transmitting of the present disclosure, since this process causes the URL for the HTML page to be ultimately provided to the information terminal 300.

The modification described above also obtains the same effects described in the embodiment. That is, when the data processing server 100 transmits source information, which is the URL for an HTML page in this example, the multifunction peripheral 200 acquires this source information (S83). Subsequently, the multifunction peripheral 200 transmits the acquired source information to the information terminal 300 (S86). The OS function of the information terminal 300 uses this source information to access the corresponding source, which is an HTML page in this example, whereby the payment URL is provided to the information terminal 300 (S88). Accordingly, the user can access the payment URL for paying the fee through an operation on the information terminal 300 in order to proceed to the payment procedure (S97, S105, S107, S109).

Since a payment URL is provided to the information terminal 300 using source information in the present modification described above, operations for paying the fee can be performed on the information terminal 300. Moreover, the print job can be executed using a general-purpose printing function in the information terminal 300 according to this method, eliminating the need to use a dedicated printing application program or dedicated printer driver on the information terminal 300. Thus, this method can improve user-friendliness.

Another feature of this modification is that the data processing server 100 generates a web page, an HTML page in this example, that includes a payment URL (S81) and transmits a URL for accessing this HTML page to the information terminal 300 (S86). When receiving this URL for the HTML page, the information terminal 300 can access the HTML page through the OS function based on the URL in order to acquire the payment URL. As a result, operations for paying the fee described above can be reliably performed on the information terminal 300 using this payment URL.

Another feature of this modification is that the information terminal 300 periodically transmits a payment address request to the multifunction peripheral 200 (S84). When the multifunction peripheral 200 receives this payment address request before acquiring a URL for the HTML page from the data processing server 100, in S85 the multifunction peripheral 200 transmits an unavailable notification to the information terminal 300 indicating that the URL for an HTML page has not yet been acquired. When the multifunction peripheral 200 receives the payment address request after acquiring a URL for the HTML page from the data processing server 100 in S83, in S86 the multifunction peripheral 200 transmits the received URL for the HTML page to the information terminal 300.

In the present modification described above, the multifunction peripheral 200 transmits a URL for an HTML page to the information terminal 300 in response to periodic accesses from the information terminal 300. This allows the information terminal 300 to receive the URL for an HTML page and access the HTML page to acquire the payment URL efficiently and reliably.

Another feature of this modification is that the print job transmitted from the multifunction peripheral 200 to the data processing server 100 is associated with the job ID (S69C) and the URL for the HTML page acquired from the data processing server 100 is also associated with the job ID (S83).

At the same time, the job ID is also associated with the payment address request received from the information terminal 300 that has transmitted the print job described above (S84). Upon receiving a payment address request, the multifunction peripheral 200 acquires the job ID associated with this request. If the acquired job ID matches the job ID associated with the URL of the HTML page, the multifunction peripheral 200 treats the information terminal 300 as the transmission target for this URL. Accordingly, the multifunction peripheral 200 transmits the URL for the HTML page to the information terminal 300 that has transmitted the payment address request (S86). In the present modification described above, the multifunction peripheral 200 can reliably transmit the URL for an HTML page to the target information terminal 300 based on the job ID.

Another feature of this modification is that the print job transmitted from the multifunction peripheral 200 to the data processing server 100 includes therewith a machine ID for identifying the multifunction peripheral 200. Accordingly, when calculating the fee for the print job in S76, the data processing server 100 can identify the multifunction peripheral 200 that will be executing the print job based on the machine ID.

<(4) Other Modifications>

In the above-described embodiment and modifications, fees for the printing operations is determined by way of calculation, but the other method for determining fees may be employed. For example, the fee table described above may include ranges for various parameters such as numbers of pages in the print job and coverages and may individually associate a fee amount with each of the ranges. In this case, the fee may be determined without any particular calculation by referring to the fee table.

Using the number of pages to be printed as an example, the table may record X yen for a range of pages from A pages to B pages, Y yen for a range of pages from B pages to C pages, etc. Thus, once the number of pages in the print job is acquired, the fee can be determined directly by referencing the table without performing the calculation in the above description.

Although the multifunction peripheral 200 executes printing operation according to the inkjet method in the above description, methods other than the inkjet method may be employed. For example, the multifunction peripheral 200 may employ a laser method for performing printing operation, and the advantages the same in those in the above description can be obtained. Alternatively, the present disclosure may be applied to a printer employing the method different from the inkjet method or the laser method, such as a thermal-transfer method or the other well-known method.

The sequence diagrams illustrated in FIGS. 2, 3, 5, 7, 9, and the like in the above description do not limit the present disclosure to the steps indicated therein. Steps may be added or deleted, or the order thereof may be changed where appropriate.

The technique described in the embodiment and modifications described above may be suitably combined to be implemented.

What is claimed is:

1. A printing device comprising:
  a printing unit configured to print an image on a print medium; and
  a controller configured to perform:
    (a) receiving a print job from an external device;
    (b) transmitting the print job to a data processing server;
    (c) receiving, from the external device, destination information representing a destination of payment information of a fee required for executing the print job with the printing unit; and
    (d) transmitting the destination information to the data processing server to cause the data processing server to provide the payment information to the external device,
  wherein the controller performs the (a) receiving, the (b) transmitting, the (c) receiving, and the (d) transmitting without acquiring the payment information.

2. The printing device according to claim 1,
  wherein the destination information includes:
    address information representing an address of a notification server; and
    token information corresponding to the external device, the notification server being configured to identify, based on the token information, the external device and an application program in the external device.

3. The printing device according to claim 1,
  wherein the destination information includes:
    address information representing an address of the external device.

4. The printing device according to claim 1,
  wherein the destination information includes:
    first identification information identifying the external device; and
    application program identification information identifying an application program in the external device.

5. The printing device according to claim 1,
  wherein at least one of the print job transmitted in the (b) transmitting and the destination information transmitted in the (d) transmitting is associated with second identification information, the second identification information identifying the printing device.

6. A printing device comprising:
  a printing unit configured to print an image on a print medium; and
  a controller configured to perform:
    (a) receiving a print job from an external device having an operating system function;
    (b) transmitting the print job to a data processing server;
    (c) receiving, from the data processing server, source information identifying a source of payment information of a fee required for executing the print job with the printing unit, the external device being configured to access the source through the operating system function; and
    (d) transmitting the source information to the external device to cause the external device to acquire the payment information.

7. The printing device according to claim 6,
  wherein the data processing server is configured to generate a web page including the payment information,
  wherein the source information includes:
    web access information for accessing the web page,
  wherein the (c) receiving includes acquiring the web access information, and
  wherein the (d) transmitting includes transmitting the web access information to the external device.

8. The printing device according to claim 7,
  wherein the controller is configured to further perform:
    (e) receiving a transmission request periodically transmitted from the external device, and
  wherein the (d) transmitting is performed in response to receiving the transmission request in the (e) receiving after acquiring the web access information in the (c) receiving.

9. The printing device according to claim 8,
  wherein the (b) transmitting includes transmitting the print job in association with second identification information, the second identification information identifying the print job,
  wherein the (c) receiving includes acquiring the web access information with which the second identification information is associated in the data processing server,
  wherein the (e) receiving includes receiving the transmission request to which the second identification information is associated in the external device, and
  wherein the (d) transmitting includes transmitting to the external device the web access information with which the second identification information associated with the transmission request is associated.

10. The printing device according to claim 6,
  wherein at least one of the print job transmitted in the (b) transmitting and the source information transmitted in the (d) transmitting is associated with third identification information, the third identification information identifying the printing device.

11. A non-transitory computer-readable storage medium storing a set of computer-readable instructions installed on and executed by a controller of a printing device, the printing device including a printing unit configured to print an image on a print medium, the set of computer-readable instructions, when executed by the controller, causing the printing device to perform:
  (a) receiving a print job from an external device;
  (b) transmitting the print job to a data processing server;
  (c) receiving, from the external device, destination information representing a destination of payment information of a fee required for executing the print job with the printing unit; and
  (d) transmitting the destination information to the data processing server to cause the data processing server to provide the payment information to the external device,
  wherein the (a) receiving, the (b) transmitting, the (c) receiving, and the (d) transmitting are performed without the printing device acquiring the payment information.

12. A non-transitory computer-readable storage medium storing a set of computer-readable instructions installed on and executed by a controller of a printing device, the printing device including a printing unit configured to print an image on a print medium, the set of computer-readable instructions, when executed by the controller, causing the printing device to perform:
(a) receiving a print job from an external device having an operating system function;
(b) transmitting the print job to a data processing server;
(c) receiving, from the data processing server, source information identifying a source of payment information of a fee required for executing the print job with the printing unit, the external device being configured to access the source through the operating system function; and
(d) transmitting the source information to the external device to cause the external device to acquire the payment information.

* * * * *